(12) United States Patent
Krehel

(10) Patent No.: US 7,150,215 B2
(45) Date of Patent: Dec. 19, 2006

(54) SAW TOOTH

(75) Inventor: Mark Krehel, Kelowna (CA)

(73) Assignee: Camco Cutting Tools Ltd., Kelowna (CA)

( * ) Notice: Subject to any disclaimer, the term of this patent is extended or adjusted under 35 U.S.C. 154(b) by 0 days.

(21) Appl. No.: 10/861,381

(22) Filed: Jun. 7, 2004

(65) Prior Publication Data

US 2004/0244560 A1 Dec. 9, 2004

Related U.S. Application Data

(60) Provisional application No. 60/476,284, filed on Jun. 6, 2003.

(51) Int. Cl.
*B27B 33/02* (2006.01)

(52) U.S. Cl. .......................... 83/839; 83/835

(58) Field of Classification Search .................. 83/839, 83/835; D15/133, 139; 144/231, 4.1, 34.1, 144/336
See application file for complete search history.

(56) References Cited

U.S. PATENT DOCUMENTS

| | | | |
|---|---|---|---|
| 3,261,384 A | 7/1966 | Henderson | |
| 3,362,446 A * | 1/1968 | Potomak | 83/855 |
| 3,945,289 A | 3/1976 | Baez Rios | |
| 3,977,447 A | 8/1976 | Pease | |
| 3,986,421 A | 10/1976 | Schultz | |
| 4,084,470 A | 4/1978 | Reed | |
| 4,180,108 A | 12/1979 | Dove | |
| 4,214,499 A | 7/1980 | Ellis | |
| 4,492,140 A | 1/1985 | Pano | |
| 4,563,929 A | 1/1986 | Ringlee et al. | |
| 4,667,713 A * | 5/1987 | Wright | 144/231 |
| 4,744,278 A | 5/1988 | Wright | |
| 4,750,396 A | 6/1988 | Gaddis et al. | |
| 4,765,217 A | 8/1988 | Ludwig | |
| 4,817,692 A | 4/1989 | Denis | |
| 4,879,936 A | 11/1989 | Anderson | |
| 4,901,929 A | 2/1990 | Barclay | |
| 4,932,447 A * | 6/1990 | Morin | 83/839 |
| 4,955,273 A | 9/1990 | Pawlosky | |
| 5,029,501 A | 7/1991 | Smith | |
| 5,058,477 A | 10/1991 | MacLennan | |
| 5,085,112 A | 2/1992 | MacLennan | |
| 5,088,371 A | 2/1992 | MacLennan | |
| 5,092,212 A | 3/1992 | Pawlosky | |
| 5,131,305 A | 7/1992 | MacLennan | |
| 5,183,089 A | 2/1993 | Norlander et al. | |
| 5,205,199 A | 4/1993 | MacLennan | |
| 5,211,212 A | 5/1993 | Carlson et al. | |
| 5,261,306 A | 11/1993 | Morey et al. | |
| 5,363,891 A | 11/1994 | Plante | |
| 5,379,672 A | 1/1995 | Thomas | |
| 5,481,952 A | 1/1996 | MacLennan | |
| 5,524,518 A | 6/1996 | Sundstrom | |

(Continued)

*Primary Examiner*—Kenneth E. Peterson
*Assistant Examiner*—Isaac Hamilton
(74) *Attorney, Agent, or Firm*—Antony C. Edwards

(57) ABSTRACT

A replaceable cutter tooth for mounting to a saw blade has a concave front cutting surface extending from and between opposite kerf forming linear side edges, and from and between a radially inner curved edge, radially inner when mounted on a saw blade, and a radially outermost curved cutting edge. A groove extends in the radial direction from the radially inner curved edge to the radially outermost curved edge, generally medially between and substantially parallel to the side edges so as to reduce the surface area of a front face of the front cutting surface of the tooth for ease of re-sharpening in the field.

1 Claim, 3 Drawing Sheets

U.S. PATENT DOCUMENTS

| | | |
|---|---|---|
| 5,579,674 A | 12/1996 | Wildey |
| 5,644,965 A | 7/1997 | MacLennan et al. |
| 5,647,263 A | 7/1997 | Wildey |
| 5,743,162 A | 4/1998 | Sundstrom |
| 5,761,981 A | 6/1998 | Stoffels |
| 5,813,308 A | 9/1998 | Wildey et al. |
| 5,855,157 A | 1/1999 | Okamura et al. |
| 6,012,663 A | 1/2000 | Bouldin |
| 6,196,106 B1 | 3/2001 | Kurelek et al. |
| 6,213,931 B1 | 4/2001 | Twardowski et al. |
| 6,220,139 B1 | 4/2001 | Kobayashi et al. |
| 6,238,146 B1 * | 5/2001 | Satran et al. ............... 407/113 |
| 6,286,406 B1 * | 9/2001 | Viswanadham et al. ...... 83/835 |
| 6,536,322 B1 | 3/2003 | Butler et al. |
| D486,503 S | 2/2004 | East |
| 6,698,477 B1 | 3/2004 | Bennington |
| 6,708,594 B1 | 3/2004 | Iinuma |
| D488,174 S | 4/2004 | East |
| 6,725,758 B1 | 4/2004 | MacLennan et al. |
| 6,957,936 B1 * | 10/2005 | Kress ....................... 408/181 |
| 2002/0112590 A1 | 8/2002 | Bohner et al. |
| 2003/0188619 A1 | 10/2003 | MacLennan et al. |

* cited by examiner

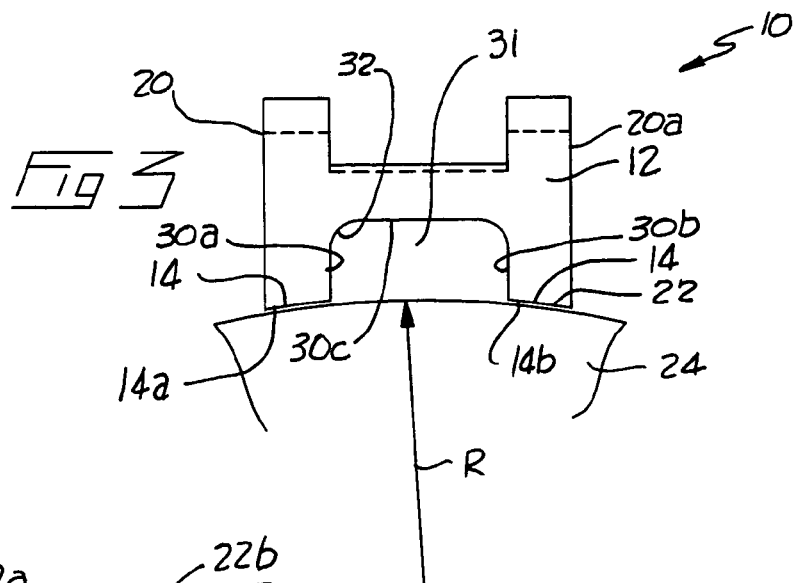
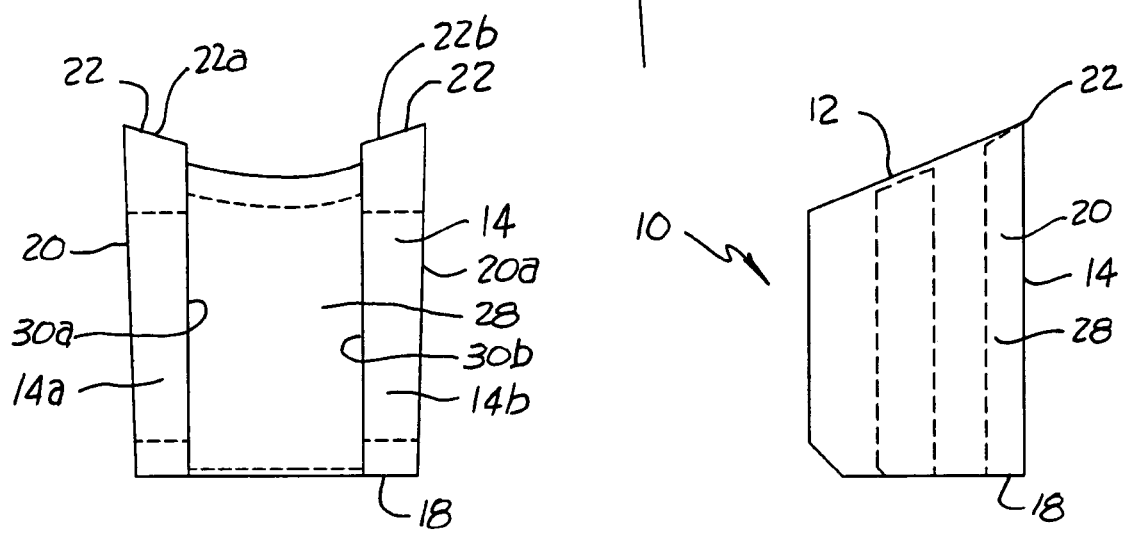
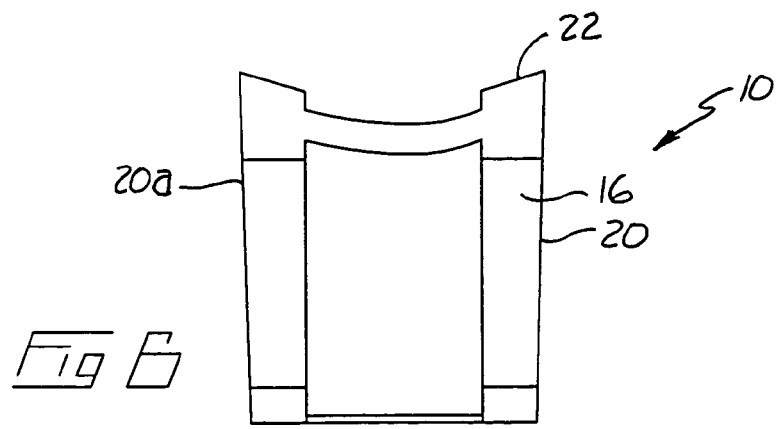

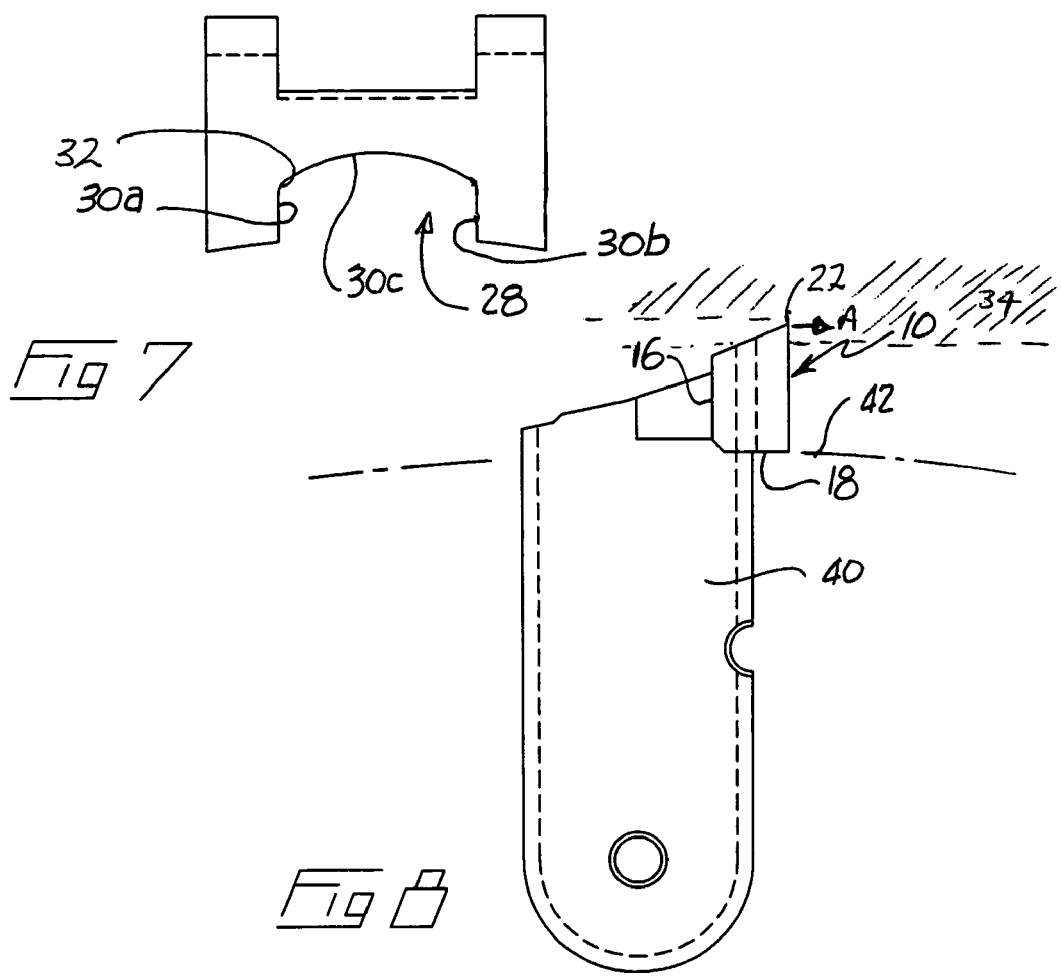
Fig 7
Fig 8
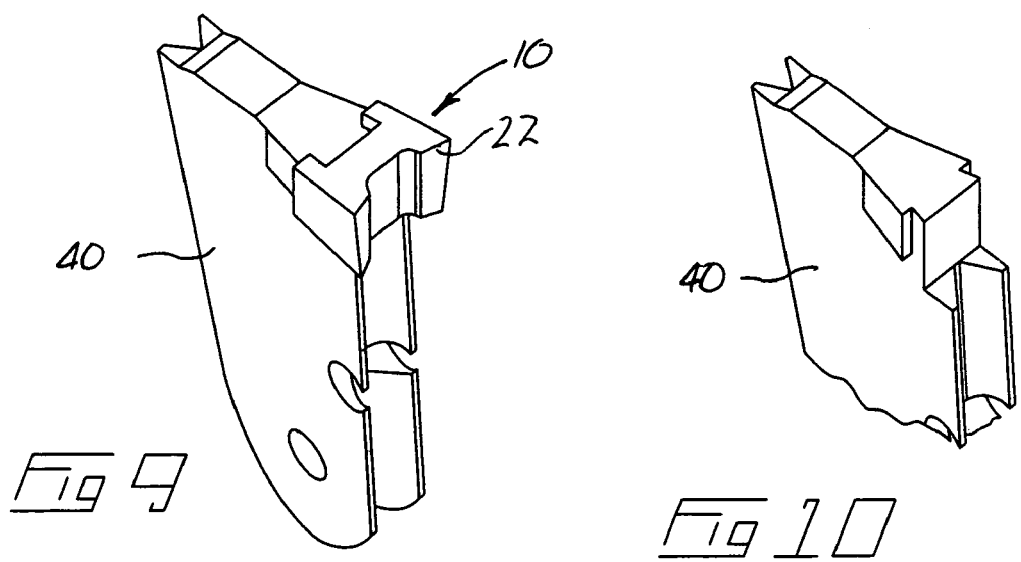
Fig 9
Fig 10

SAW TOOTH

CROSS REFERENCE TO RELATED APPLICATION

This application claims priority from U.S. Provisional Patent Application No. 60/476,284 filed Jun. 6, 2003 entitled Saw Tooth.

FIELD OF THE INVENTION

This invention relates to a replaceable carbide saw tooth, wherein the leading cutting face is arcuately concave and contains a medial, radially aligned recess.

BACKGROUND OF THE INVENTION

Replaceable cutting teeth are commonly used on circular saws utilized in the wood or pulp manufacturing industry. Generally such teeth are preferably manufactured from a composite material having abrasion resistant properties such as tungsten carbide and are attached by braising or the like to the attack faces of a radial array of gullets formed about the periphery of a saw blank. Alternatively, such cutting teeth can be similarly attached to an elongated tooth holder or shank. A plurality of holder and cutting tooth assemblies may then be removably secured by bolting, pinning or other well known means within a radially aligned array of recesses formed about the periphery of a circular saw blank.

Such cutting tips when positioned on a circular saw blank have an upper cutting surface which extends radially outwardly of the periphery of the saw blank and extends generally parallel to the axis of saw rotation. Side cutting surfaces extend laterally outwardly of either the saw blank or the tooth holder or shank forming the kerf.

In the prior art applicant is aware of U.S. Pat. No. 4,084,470 which issued Apr. 18, 1978 to Reed, which discloses a cutting tooth secured to a holder or shank for insertion within a plurality of radially extending slots formed within the periphery of a flat steel disc.

The applicant is further aware of U.S. Pat. No. 4,765,217 which issued Aug. 23, 1988 to Ludwig, which discloses a cutting tip secured to a holder or shank. The teeth are formed so as to have a leading face which is generally "V" shaped or arcuately shaped in sectional view taken on a plane generally parallel to the axis of saw rotation.

SUMMARY OF THE INVENTION

In the present invention a cutting tip has a generally arcuately concave leading face, when viewed in section, the face having a medial recess so as to reduce the contact surface area of the leading face of the cutter tip for ease of sharpening.

In summary, the replaceable cutter tooth for mounting to a saw blade according to the present invention includes a substantially concave front cutting surface extending from and between opposite kerf forming side edges, and from a radially inner curved edge, radially inner when mounted on the saw blade, to a radially outermost curved cutting edge. A groove extends in a radial direction, relative to the saw blade when the tooth is mounted thereon, from the radially inner curved edge to the radially outermost curved edge. The groove may be generally medially positioned between, and substantially parallel to, the side edges so as to reduce the surface area of a front face of the front cutting surface. The groove is recessed behind the front face relative to a direction of travel of the tooth when on the saw blade and the saw blade sawing a workpiece. The surface area is thereby reduced for ease of re-sharpening of the tooth.

The tooth may have a concave top surface, and the front cutting surface, a rear surface, a bottom surface and opposite side surfaces. A top cutting edge is formed at an intersection of the top surface and the front cutting surface. When viewed in side profile, the intersection of the top surface and the cutting surface forms an acute angle. The bottom may surface and the front cutting surface intersect generally at right angles, and the side surfaces may converge toward the bottom surface.

The groove includes an oppositely disposed, laterally spaced apart pair of side groove surfaces defining a rear groove surface therebetween recessed behind the front face. The front face includes a pair of laterally spaced apart faces on either side of the groove and elongate in the radial direction. The side groove surfaces and the rear groove surface define a channel. The rear groove surface may be planar or concave or otherwise non-planar.

BRIEF DESCRIPTION OF THE DRAWINGS

FIG. 3 is a plan view of the saw tooth of FIG. 2.

FIG. 4 is a front elevation view of the tooth, viewed in the direction opposite to the direction of rotation of the saw of FIG. 2.

FIG. 5 is a left hand side elevation view of the tooth of FIG. 2.

FIG. 6 is a tear elevation view of the tooth of FIG. 2.

FIG. 7 is a plan view of an alternative embodiment of the tooth in which bottom of the recess is arcuate.

FIG. 8 is a side view of an assembled tooth and holder.

FIG. 9 is a perspective view of the device illustrated in FIG. 8.

FIG. 10 is a perspective view of a portion of the tooth holder with the cutting tooth removed.

DETAILED DESCRIPTION OF EMBODIMENTS OF THE INVENTION

Saws used in wood or pulp manufacturing generally have replaceable cutting teeth which are either braised directly to a circular saw or braised to a tooth holder which is secured to the circular saw in one of several methods well known to the art.

Figure 1:
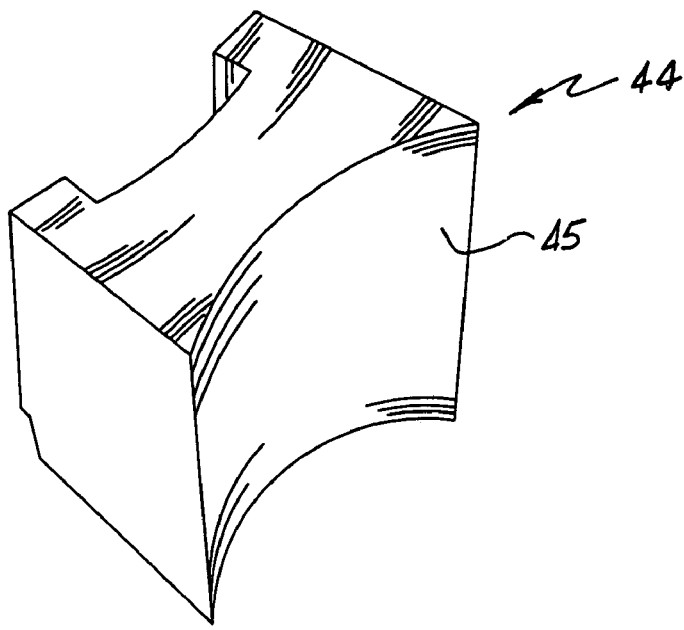
FIG. 1 is a perspective view illustrating a prior art saw tooth.
Figure 2:
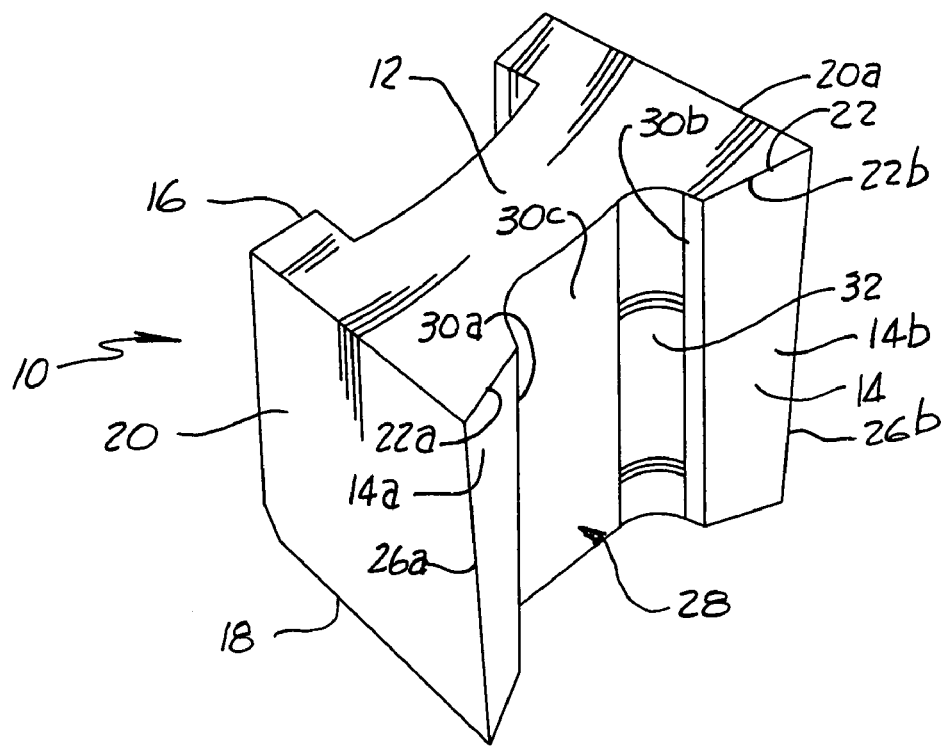
FIG. 2 is a perspective view of the saw tooth of the present invention.

In the prior art 44, illustrated in FIG. 1, the front face 45 presents a large continuous surface area. Consequently, re-sharpening this type of tooth presents an undue level of difficulty since the grinding wheel must be applied against the face 45 with a large amount of pressure. Further, without a clearly defined groove or notch the flow of sawdust may not be efficiently channelled away from the cutting surface of the tooth.

As can be seen in FIGS. 2 through 6, replaceable cutter tooth 10 has a concave top surface 12, a front surface 14, a rear surface 16, a bottom surface 18 and opposite side surfaces 20 and 20a respectively. A top cutting edge 22 is formed at the intersection of top surface 12, and front surface 14. When viewed in side profile, as illustrated in FIG. 5, the intersection of top surface 12 and front surface 14 forms an acute angle as a result of surface 12 sloping rearwardly and slightly downwardly with respect to cutting edge 22. Bottom surface 18 and front surface 14 intersect generally at right angles. Side surfaces 20 and 20a converge slightly toward surface 18.

Front surface 14 is arcuately concave with a radius R of, in one embodiment, one inch. In the prior art, re-sharpening of face 14 is usually accomplished by hand using a diamond abrasive wheel 24 generally of two inches in diameter. Difficulty has been experienced when field sharpening such teeth since the amount of pressure required to be applied by hand for effective sharpening is difficult to achieve.

To overcome this difficulty, in the present invention front surface 14 is formed with a medial notch, channel or groove 28 (collectively referred to as a groove) formed intermediate side surfaces 20 and 20a. Groove 28 has parallel sides 30a and 30b and a flat bottom or back surface 30c which is recessed behind the curvature or surface of front surface 14. The intersection of sides 30a and 30b with bottom 30c of groove 28 define smoothly radiused corners 32, which reduce shear stress at the intersection and inhibit breakage of the tooth. Groove 28 separates front surface 14 into surfaces 14a and 14b and creates cutting surfaces 22a and 22b. Groove 28 further allows greater sawdust flow during rotation of the sawblade in direction A so as to saw work piece 34 as sawdust is channelled through groove 28. The intersection of sides 20 and 20a of tooth 10 with front surfaces 14a and 14b creates side cutting edges 26a and 26b.

An alternative form of groove 28 is illustrated in FIG. 7 wherein the bottom 30c of groove 28 is arcuately concave and is radiused where it intersects sides 30a and 30b.

As may be viewed in FIGS. 8 through 10 replaceable cutter tooth 10 may be mounted directly onto a saw or indirectly through the use of a tooth holder or shank 40 as illustrated. Tooth 10 has the rear surface 16 and bottom surface 18 suitably shaped so as to afford a close toleranced fit with tooth holder or shank 40 for subsequent braising thereto.

Holder 40 is designed for removable mounting on to a saw in a radial aspect in a manner well noted in the prior art so that cutter tooth 10 projects radially outwardly of saw 42. Such mounting on a saw ensured that front surface 14 and groove 28 are also positioned in a radial aspect so as to project edge 22 radially outwardly relative to the saw 42.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A replaceable cutter tooth for mounting to a saw blade wherein the tooth comprising:

a substantially concave front cutting surface extending from and between opposite kerf forming side edges, and from a radially inner curved edge, radially inner when mounted on the saw blade, to a radially outermost curved cutting edge, a groove extending in a radial direction, relative to the saw blade when said tooth is mounted thereon, from said radially inner curved edge to said radially outermost curved cutting edge, generally medially between and substantially parallel to said side edges so as to reduce the surface area of a front face of said front cutting surface, wherein said groove is recessed behind said front face relative to a direction of travel of said tooth and is an open groove when on said saw blade and said saw blade sawing a workpiece, whereby said surface area is reduced for ease of re-sharpening of said tooth and whereby said groove is not used for mounting a further cutting implement in it so as to occlude said groove during said sawing, wherein said tooth has a concave top surface, said front cutting surface, a rear surface, a bottom surface and opposite side surfaces, and wherein said radially outermost curved cutting edge is a top cutting edge formed at an intersection of said top surface and said front cutting surface and wherein when viewed in side profile, said intersection of said top surface and said front cutting surface forms an acute angle, wherein said bottom surface and said front cutting, surface intersect generally at right angles, and said side surfaces converge toward said bottom surface.

* * * * *